United States Patent
Leaney

(10) Patent No.: US 6,748,330 B2
(45) Date of Patent: Jun. 8, 2004

(54) METHOD AND APPARATUS FOR ANISOTROPIC VECTOR PLANE WAVE DECOMPOSITION FOR 3D VERTICAL SEISMIC PROFILE DATA

(75) Inventor: Scott Leaney, Henmead (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 76 days.

(21) Appl. No.: 10/205,121

(22) Filed: Jul. 25, 2002

(65) Prior Publication Data

US 2003/0195705 A1 Oct. 16, 2003

Related U.S. Application Data

(60) Provisional application No. 60/371,352, filed on Apr. 10, 2002.

(51) Int. Cl.[7] .................................................. G01V 1/00
(52) U.S. Cl. ........................................... 702/14; 367/57
(58) Field of Search ................................ 702/14; 367/57

(56) References Cited

U.S. PATENT DOCUMENTS

| | | | | |
|---|---|---|---|---|
| 4,648,039 A | * | 3/1987 | Devaney et al. ............... | 367/57 |
| 4,809,239 A | | 2/1989 | Esmersoy | |
| 4,870,580 A | * | 9/1989 | Lang et al. .................... | 702/17 |
| 5,214,613 A | * | 5/1993 | Esmersoy ..................... | 367/31 |

OTHER PUBLICATIONS

"Parametric Wavefield Decomposition and Applications", Leaney, Society of exploration Geophysicists, vol. 1, Annual International SEG Meeting, 1989.*
"P–Wave and S–wave Separation in Thin Beds", Lang et al., IEEE Transactions on GeoScience and Remote Sensing, vol. 26, No. 2, Mar. 1988.*

Leaney, Anisotropic vector plane wave decomposition for 3D VSP data, SEG Int'l Expositon and 72nd Annual Meeting, Oct. 2002, pp. 2369–2372.
Leaney and Esmersoy, Parametric Decomposition of Offset VSP Wave Field's Expanded Abstracts, 59th Annual International SEG Meeting, 1989, BG 1.8, pp26–29.
Leaney, Parametric Wavefield Decomposition and Applications, Expanded Abstracts, 60th Annual International SEG Meeting, 1990, SE 2.4, pp 1097–1100.
Esmersoy, Velocity Estimation from Offset VSPs Using Direct P and Converted SV–Waves, Expanded Abstracts, 58th Annual International SEG Meeting, 1988, POS 6.4, pp538–541.
Schoenberg and De Hoop, Approximate dispersion relations for qP–qSV–waves in transversely isotropic media, Geophysics, vol. 65, No. 3, 2000, pp919–933.
Esmersoy, Inversion of P and SV waves from multicomponent offset vertical seismic profiles, Geophysics, vol. 55, No. 1, 1990, pp39–50.

* cited by examiner

Primary Examiner—John Barlow
Assistant Examiner—Toan M Le
(74) Attorney, Agent, or Firm—William L. Wang; Brigitte Jeffery; John Ryberg

(57) ABSTRACT

A wavefield separation method and apparatus for 3D VSP data, which handles arbitrary 3D source and receiver geometries, and common shot 3C data oriented to North, East and Vertical geographical coordinates and makes use of anisotropic medium properties at the downhole receivers. When given a range of propagation angles, slowness and polarization vectors are computed for each plane wave and a linear system is solved at each frequency to yield the scalar plane-wave amplitudes. A novel regularization scheme is used that obviates the need for eigen analysis of the steering matrix. Sums within subsets of these scalar plane waves are constructed to provide up and down qP (P), qS (Sv) and Sh wavefields. Vector residuals can be computed for parameter testing, quality control and imaging purposes.

56 Claims, 8 Drawing Sheets

Down P wavefields from present invention (left) and prior art method (right).

Up P wavefields from present invention (left) and prior art method (right).

METHOD AND APPARATUS FOR ANISOTROPIC VECTOR PLANE WAVE DECOMPOSITION FOR 3D VERTICAL SEISMIC PROFILE DATA

This application claims benefit of 60/371,352 filed Apr. 10, 2002.

BACKGROUND OF INVENTION (1) Field of Invention

This invention relates generally to borehole seismic surveys and particularly to vertical seismic profiles (VSPs) and related VSP data processing techniques.

(2) Background Art

It is common to perform a seismic survey to obtain information concerning subsurface geological conditions. In addition to surface seismic surveys, borehole seismic data can be acquired by generating a seismic wave by a source on the surface and sensing the seismic wave using seismic detectors placed in a borehole. The seismic detectors are operable to detect the propagating seismic wave as it passes through different areas in the subterranean strata. Inferences can be made concerning the subterrain earth formations by analyzing the seismic detector data. A vertical seismic profile (VSP) or well-to-well profile can be generated from the seismic wave information sensed by the detectors.

The seismic detectors utilized for VSP are typically 3 component (3C) geophones which are placed in firm contact with the wall of the borehole and which are operable to produce electrical signals indicative of the seismic wave or movement of the sub-terrain formations along each of the orthogonal axis of the geophone. The seismic waveforms obtained during VSP measurements typically have a compressional (P) wave component and a shear (S) wave component. This is an important aspect of VSP because fluids can only support P waves in which the particle motion comprising the wave is parallel to the direction of wave propagation, whereas solids can also sustain S waves in which the direction of particle motion is transverse to the direction of wave propagation. In analyzing the seismic wave it is sometimes important to separate or decompose the wave into its separate P and S components. Independent examination of P and S wave characteristics may be useful for analyzing the VSP data.

There are various separation or decomposition methods utilized to separate the seismic waveform into its P and S wave components. Two dimensional transform techniques have been utilized for wavefield decomposition which implicitly model the input data as the sum of a large number of plane waves. The separation of wavefields is then accomplished by operating on the transformed data and inverse transforming. However, for a reliable transform of the spatial variable to be achieved, a relatively long geophone array is required, over which medium parameters should be nearly constant. With this transform technique, if moveout changes rapidly, the separated wavefield will show smearing and a subsequent loss of spatial (vertical) resolution.

In addition to the transform technique, parametric wavefield decomposition methods have been utilized where seismic propagation through the formation is described in terms of a model incorporating a plane compressional wave and a plane shear wave propagating with unspecified velocity and direction. Values are then derived for the velocity and direction of propagation of these plane waves that provide a best fit of the model to the measurement. This method is effective if a model wherein the data is assumed to be the sum of a known and small number of locally planar wavefronts is sufficient. Such a parametric inverse method to model the downgoing P and S wavefield is described in U.S. Pat. No. 4,809,239, to Esmersoy, incorporated herein by reference. This method analyzes seismic propagation in terms of the behavior of plane wave components over a short section of a borehole. However, this method of analysis has some basic assumptions such as the measurements can be appropriately described in terms of propagation of plane wavefronts of seismic energy. Also, it is assumed that the formation is locally homogeneous and that there is no coupling between orthogonally polarized shear wave components.

The parametric inversion method described in U.S. Pat. No. 4,809,239, which models the downgoing P and S wave fields from multicomponent VSP data, has further been generalized to model wave fields on single component and upgoing data in a paper by Leaney and Esmersoy in Expanded Abstracts, 59th Annual International Society of Exploration Geophysicists (SEG) Meeting, 1989. Generalizations in formulation and solution were used in that paper. To summarize the parametric wavefield decomposition (PWD) technique, the problem of decomposing a seismic data set into its constituent wave fields is formulated as a parametric inversion, where each wave field is modeled by its Fourier components and by frequency independent parameters. Modeling the data as a sum of a small number of plane wave fields rather than a large number of plane wave fields has the advantage that a small spatial aperture is required for inversion. Also, the use of multicomponent data allows P and S wave polarization information to be included in the model. A non-linear optimization is used to estimate apparent velocities of interfering events such that no picking is necessary to obtain optimum wave field separation. Also, the method utilizes a vectorial formulation for multicomponent data which permits arrival angle and velocity estimation. The generalized method leads to a single component and two-component wave field decomposition. Computational details of the more generalized method were described in a paper by Leaney, published in Expanded Abstracts, 60th Annual International SEG Meeting, 1990.

However, a limitation with the prior art methods is the assumption of a small number of plane waves and a small spatial aperture. These assumptions, while useful in many circumstances, have limited effectiveness with complicated wavefields or arbitrary well geometries. A wavefield separation technique is needed that does not make these limiting assumptions.

BRIEF SUMMARY OF INVENTION

The invention is a method and apparatus for anisotropic wavefield decomposition for three-dimensional (3D) Vertical Seismic Profile (VSP) data. The present method makes use of general anisotropic medium properties such as tilted TI (transverse isotropic) medium properties at the downhole receivers, common shot 3C data oriented to North, East, and Vertical geographical coordinates and handles arbitrary 3D source and receiver geometries. Having specified a range of propagation angles, slowness and polarization vectors are computed for each plane wave and a linear system is solved at each frequency to yield the scalar plane-wave amplitudes. A novel regularization scheme is used that obviates the need for eigen analysis of the steering matrix. Sums within the subsets of these scalar plane waves are constructed to provide up and down qP (P), qS (Sv), and Sh wavefields. Vector residuals can be computed for parameter testing, quality control and imaging purposes. If there are more receivers than plane waves, residuals can be minimized iteratively to determine medium TI parameters. The present wavefield separation invention is well suited to the longer array tools now available and provides superior wave type separation. This invention simplifies the job of 3C elastic wavefield separation, particularly for deviated wells and 3D geometries, thus reducing processing turn around time.

The method comprises the steps of specifying propagation angles for each wave type by specifying the angular aperture (elevation angle) and number of plane waves; accessing common shot 3C vector data for each receiver in the array; extracting medium properties local to the receiver array such as the TI elastic moduli; computing the 3D slowness and polarization vector operators at each receiver; Fourier transforming (FT) all waveforms; inverting the projection moveout matrix; applying the operator to the data at each frequency; constructing sums of subsets of plane waves based on wave type and propagation angle; and inverse Fourier transforming all waveforms.

The present invention assumes the wavefield data are made up of a broad plane wave spectrum and hence, the present invention works better for longer receiver arrays. Another advantage of the present invention is that it is fully 3D in that arbitrary well geometries are handled and 3C because all components, once oriented to a geographical (East, North, and Vertical) coordinate system, can be used in the decomposition. The more traditional 2D and 2C geometries are also handled. Also 4C seismic data (3C plus hydrophone) may be handled. The present invention uses known medium properties and plane wave propagation angles to compute the slowness and polarization vectors through a forward modeling step. These are then used to decompose the vector recording into its scalar plane wave constituents.

The present invention performs VSP elastic wavefield decomposition. It can be implemented as a software module in a VSP processing routine. It can be used in a VSP processing chain, after data rotation of 3C downhole array data to geographic coordinates, and before deconvolution and imaging. Some of the advantages and features are: many more than four (4) plane waves are determined, making it ideal for longer array tools; it uses 3D (or 2D) slowness and polarization vectors in absolute geographical coordinates, and not in a well coordinate system; slowness and polarizations are computed given medium properties and propagation angles rather than determined from the data; it handles tilted TI medium explicitly; a general 3D geometry is handled; and hydrophone data is easily included in the formulation.

These and other advantageous features of the present invention will be in part apparent and in part pointed out herein below.

BRIEF DESCRIPTION OF THE DRAWINGS

For a better understanding of the present invention, reference may be made to the accompanying drawings in which.

DETAILED DESCRIPTION OF INVENTION

Figure 1:
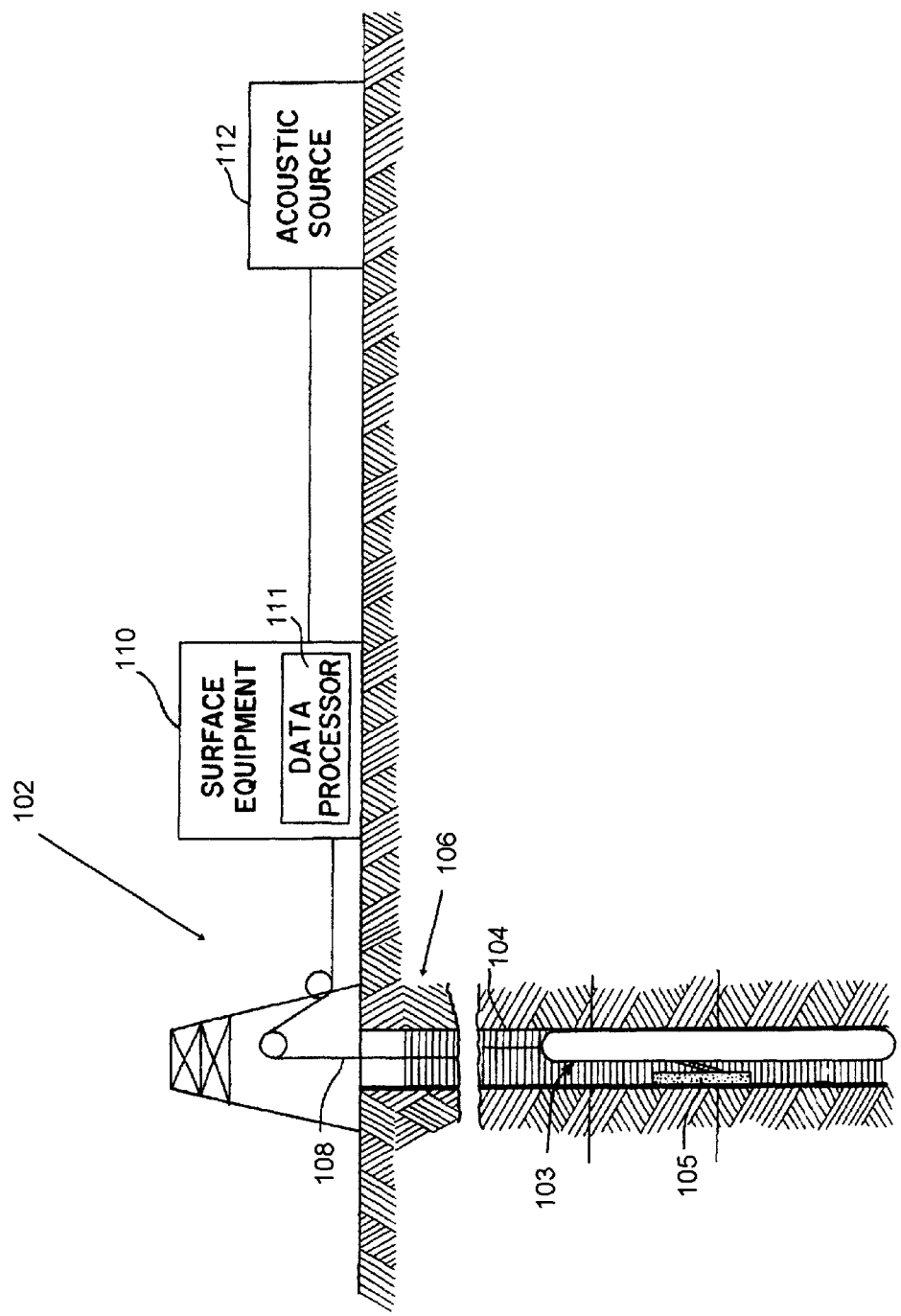
FIG. 1 is an illustrative diagram of a borehole seismic operation for collecting VSP data for use in accordance with the present invention.

According to the embodiment(s) of the present invention, various views are illustrated in FIGS. 1–8 and like reference numerals are being used consistently throughout to refer to like and corresponding parts of the invention for all of the various views and figures of the drawing.

One embodiment of the present invention comprising the steps of specifying propagation angles for each wave type by specifying the angular aperture (elevation angle) and number of plane waves; accessing common shot 3C vector data for each receiver in the array; extracting medium properties local to the receiver array such as the TI elastic moduli; computing the 3D slowness and polarization vector operators at each receiver; Fourier transforming (FT) all waveforms; inverting the projection moveout matrix; applying the operator to the data at each frequency; constructing sums of subsets of plane waves based on wave type and propagation angle; and inverse Fourier transforming all waveforms, teaches a novel apparatus and method for anisotropic wavefield decomposition for three dimensional (3D) Vertical Seismic Profile (VSP) data.

The details of the invention and various embodiments can be better understood by referring to the figures of the drawing. Referring to FIG. 1, a logging tool 102 is shown suspended in a borehole 104 and clamped to the borehole wall 105 which penetrates the earth formation 106. A cable 108 extends up the borehole and connects to surface equipment 110 having computing and data processing capability 111. The logging tool 102, shown as a downhole sonde 103 in FIG. 1 but alternatively may be an array of seismic receivers deployed along a conveyance, includes three (3) component seismic receivers, such as geophones arranged to detect particle motion along each of the three orthogonal axes and the downhole tool is operable to produce an electrical signal indicative of the particle motion and further operable to transmit the signal uphole via the cable to the surface equipment. While describing the use of 3C seismic receivers, it is contemplated within the scope of the present invention that other types of seismic receivers such as 4 component (4C) seismic receivers, 2C seismic receivers, geophone accelerometers, or hydrophones may also be used. Similarly, while describing the processing of 3C seismic data, it is contemplated within the scope of the present invention that 2C or 4C seismic data may be processed. A source of acoustic energy 112 is located on the surface near the borehole. Suitable acoustic sources are well known to those skilled in the art and need not be described here.

When the source is energized to propagate seismic energy in to the earth formation, the downhole logging tool acquires the data. The seismic energy can reach the borehole and hence the seismic receivers deployed in the borehole. Once the seismic energy is sensed by the seismic receiver the downhole logging tool generates an electrical signal representative of the formation particle motion along each of the three orthogonal axes. These signals are transmitted by the logging tool uphole via the cable to the surface equipment. The logging tool may have a long array of seismic receivers each of which senses seismic signals and the signal sensed by each seismic receiver in the array may be transmitted uphole as an electrical signal.

The surface equipment which receives the electrical signals representative of the seismic data will typically have computing or data processing capability for controlling the logging operation as well as recording, analyzing and/or transmitting the seismic data. It is well understood by those skilled in the art area that methods outlined herein can be implemented by programming of a general purpose computer with an appropriate algorithm and executing said algorithm and/or by providing an electronic circuit to perform the same.

Seismic data from an array of three-component geophones may be modeled as the sum of N plane waves, each with slowness vector $s_n$ and polarization vector $h_n$ as:

$$d(x_m, t) = \sum_{n=1}^{N} a_n h_n e^{i\omega s_n \cdot x_m}. \quad (1)$$

Here, d is the vector of 3C data and $x_m=(x_E, x_N, x_Z)_m$ is the $m^{th}$ 3C receiver in absolute coordinates Easting, Northing, and depth, Z.

Equation (1) says that a plane wave at frequency $\omega$ has complex amplitude $a_n$ and moveout across the array given by its 3D slowness vector $s_n$ dotted with the 3D receiver array $x_m$. It also has a 3D polarization vector at each receiver in the array. The slowness and polarizations come in pairs for each plane wave n, and each plane wave has a type, either qP, qSv, or Sh. The slowness and polarization vectors are computed given the plane wave propagation angles and medium properties local to the receiver array, these being the TI elastic moduli and symmetry axis angles (or angle if 2D). The matrix defined by:

$$h_n e^{i\omega s_n \cdot x_m}$$

has N columns and 3M (2M) rows, where M is the number of seismic receivers. This "polarization-moveout" or "steering" matrix may be denoted G. The linear system to solve at each frequency to determine the model vector of scalar plane-wave Fourier coefficients $m=(a_1,a_2, \ldots ,a_N)$ may then be written Gm=d. Note that the system is purely underdetermined when 2M(3M)<N. Under this condition the system of equations can be solved using the minimum length generalized inverse approach:

$$m=G^H[GG^H+\beta I]^{-1}d, \quad (2)$$

where H signifies Hermitian transpose since the matrix G is complex. This approach can be found in references such as Menke, 1984, Geophysical data analysis—Discrete theory, Academic Press, Inc. $\beta$ need not be a constant as is indicated in equation (2) but can depend on both frequency f and plane-wave index n. Equation (2) may be written using the notation of the generalized inverse $m=G^{-g}d$, where $G^{-g}$ is a linear operator. Useful matrices such as the model resolution matrix, $G^{-g}G$ and the model covariance matrix, $G^{-g}G^{-gH}$ can be computed to study properties of the operator, useful in parameter selection.

Figure 2:
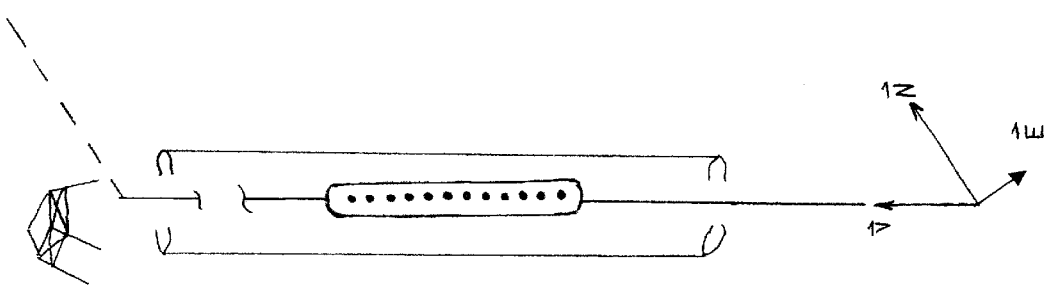
FIG. 2 is a diagram showing a coordinate system used for an embodiment of the present invention.
Figure 3:
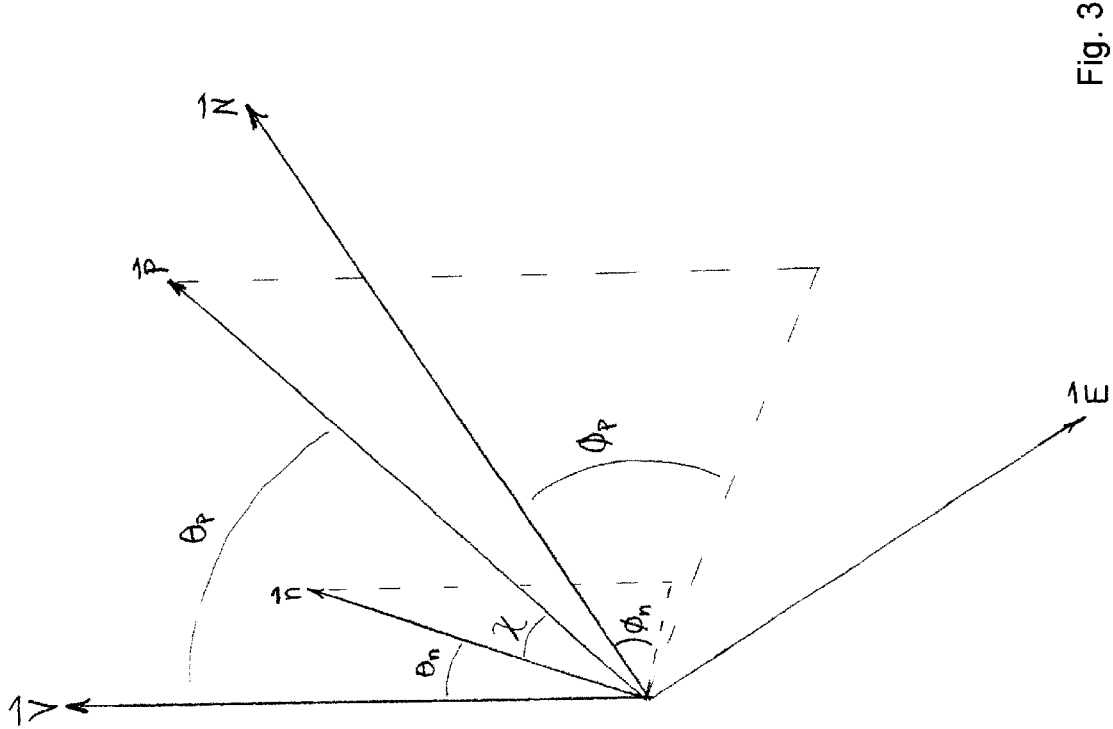
FIG. 3 is a representative diagram showing the directions of propagation and particle motion of typical P and S waves in the coordinate system of FIG. 2.

Slowness and polarizations are computed for a tilted vertical traversely isotropic (VTI) medium in 3D by using a range of propagation angles and tilted TI medium properties through a forward modeling step. Consider a tilted TI medium described by 5 moduli $A_{33}$, $A_{11}$, $A_{13}$, $A_{44}$, $A_{66}$, and two symmetry axis tilt angles $\theta_n$ and $\phi_n$. Refer to FIGS. 2 and 3 which shows a vertical tool, although it is understood that the invention is also applicable to tools in vertical tool, although it is understood that the invention is also applicable to tools in deviated boreholes. Let the symmetry axis of the medium relative to vertical be specified by the vector $n=(n_x, n_y, n_z)=(\sin\theta_n \sin\phi_n, \sin\theta_n \cos\phi_n, \cos\theta_n)$ where $\theta_n$ is the dip angle relative to vertical and $\phi_n$ is the azimuth of the down dip direction. Now define the propagation (phase) direction by $p=(p_x, p_y, p_z)=(\sin\theta_p \sin\phi_p, \sin\theta_p \cos\phi_p, \cos\theta_p)$. The angle between the propagation direction and the symmetry axis is $\chi=\cos^{-1}(p.n)$. The slowness vector is then $(s_z=\cos\chi/v, s_x=\sin\chi/v)$ where v is the phase velocity of the medium and $s_x=s_r \sin\phi_p$ and $s_y=s_r \cos\phi_p$. The phase velocity may be determined from published references such as Musgrave, 1970, Crystal Acoustics, McGraw-Hill.

$$v^2 = \frac{1}{2}\left( \frac{A_{44} + A_{33}\cos^2 x + A_{11}\sin^2 x \pm}{\sqrt{[(A_{33} - A_{44})\cos^2 x - (A_{11} - A_{44})\sin^2 x]^2 + 4a^2\cos^2 x \sin^2 x}} \right) \quad (3)$$

for P(+) and Sv(−) waves with $a=A_{13}+A_{44}$. For Sh waves the phase velocity is given by $$v^2 = A_{66} \sin^2 x + A_{44} \cos^2 x. \quad (4)$$

The polarization angle or vector for P-SV waves at propagation angle (phase angle) $\tan\theta=p_r/p_z$ relative to the symmetry axis is given by:

$$\tan\phi = \frac{e_x}{e_z} = \frac{(A_{44} + A_{13})P_r P_z}{1 - A_{11}P_r^2 - A_{44}P_z^2}. \quad (5)$$

The polarization vector for Sh waves is perpendicular to the propagation direction and so is given by $(\cos\phi_p, \sin\phi_p, 0)$.

In practice, the algorithm used makes use of rotations by the symmetry axis angles and a routine to compute slowness and polarizations for qP, qSv and Sh waves given propagation (phase) angle for a VTI medium. Thus, for the nth propagation direction the slowness and polarization vectors of a given wave type, qP, qSv or Sh, can be computed from local medium parameters and inserted into equation (1).

The slowness and polarization vectors can then be used to decompose the vector seismic recording into its scalar plane wave constituents. The 3D or (2D) slowness and polarization vectors are in absolute geographical coordinates (East, North, and Vertical), and not apparent slowness and polarization vectors in a well coordinate system. The slowness and polarization vectors with the present invention are computed given medium properties and propagation angles rather than being determined from the seismic data. Also, with the present method many more than four (4) planes can be determined, which makes the present method ideal for longer array tools. The present method is fully 3D in that arbitrary well geometries can be handled and 3C because all components, once oriented to the geographical coordinate system, can be used in the decomposition of the seismic wave vector recording.

The inclusion of polarization vectors in the formulation means that the columns of G remain linearly independent even at aliasing frequencies. This useful property breaks down when polarization vectors approach colinearity. This occurs, for example, for vertically propagating up and down shear waves and between oblique up and down P and Sv waves. In the latter case, this happens for P angles of around 60 degrees. When colinear polarization occurs, regularization at the offending aliasing frequencies is necessary to maintain operator stability.

A second operator pathology occurs when waves have colinear moveout. This can occur between near vertical P waves and wide-angle Sv waves, where the ratio of the sine of angles equals the Vp/Vs ratio. Even though the difference in polarization vectors keeps the steering vectors apart, they are numerically close at all frequencies and clean separation is not possible. The problem is worse for higher Vp/Vs ratios since polarization vectors approach colinearity. This inseparability is a manifestation of the common shot VSP geometry. A vertical array typically provides insufficient measurements to distinguish between a vertical P wave and a wide angle shear wave. Well deviation may be helpful but generally the combinations of wave type propagation angle and receiver geometry conspire against clean wavefield separation. Often all that can be done is to stabilize the matrix inversion through damping.

Both operator pathologies discussed above cause instabilities in the inversion of the matrix $GG^H$, resulting in the need to restore diagonal dominance and stability. In the present invention this is carried out using a novel approach that does not require eigen analysis of G. This novel approach determines wave-type and frequency-dependent diagonal damping factors by examining the values of $GG^H$ in the off-diagonal blocks. The damping factor at frequency f for plane wave i is determined from:

$$G_{ii} = M + (G_{ij}(\max)/M)^2 + G_{ij}(\max) * \text{damp},$$

where M is the number of receivers and damp is a user defined constant.

Figure 8:
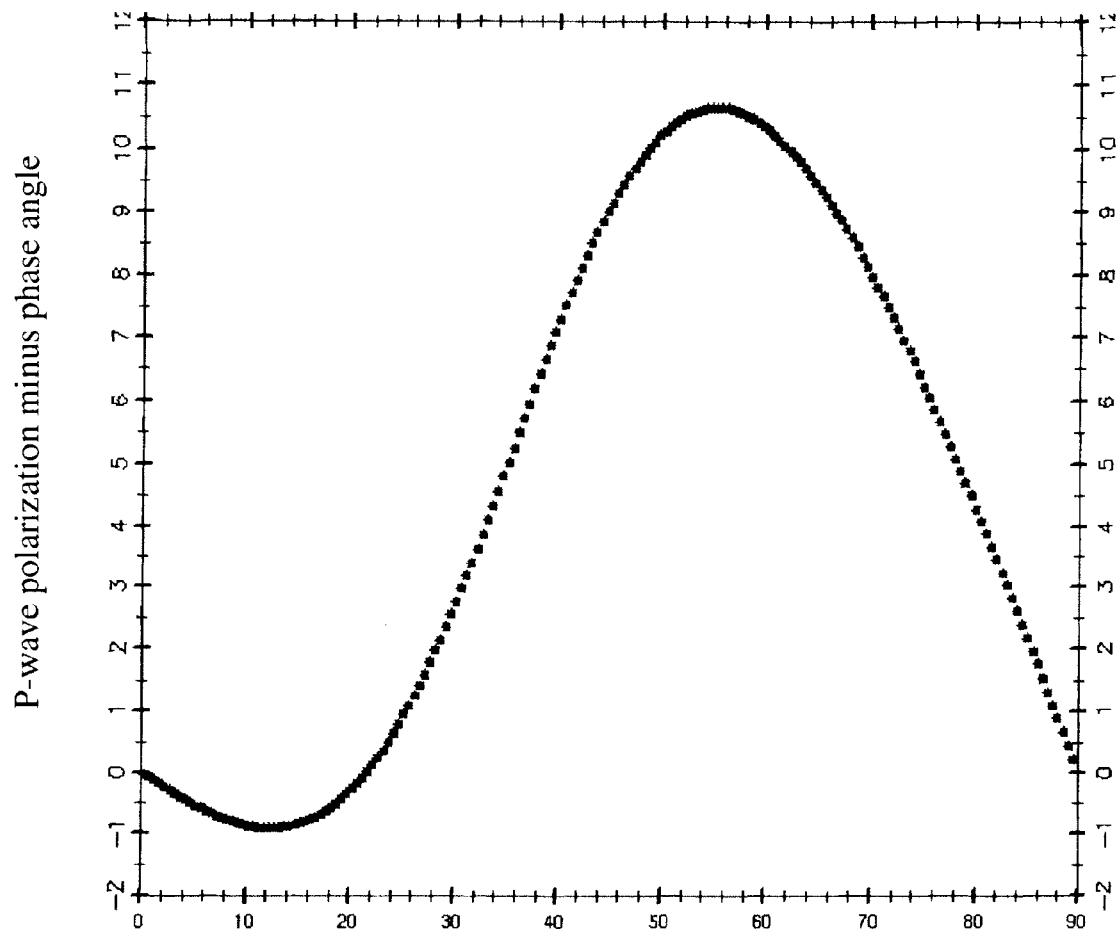
FIG. 8 shows polarization angle minus phase angle versus phase angle for a qP wave given medium parameters.

The impact of anisotropy on the quality of the wavefield separation can be significant. FIG. 8 shows polarization angle minus phase angle versus phase angle for a qP wave given VTI medium parameters (3.,1.5,0.2,0.5) (Vp(0)=3.0, Vs(0)=1.5, $\epsilon_p$=0.2, $\epsilon_a$=0.5) where velocities are in km/s and anisotropy parameters are those of the type found in "Approximate dispersion relations for qP-aSV-waves in transversely isotropic media," Schoenberg and de Hoop, Geophysics, Vol. 65, No. 3, pp. 919–933, 2000. Notice that the difference between polarization and phase angle can exceed ten degrees. To see the impact of this, simple synthetic data were generated with four plane waves, one each for down qP, up qP, down qSv, and up qSv. Propagation angles are 40 degrees for all events. The separation is shown in FIG. 2 for the isotropic and the correct VTI models. Clearly, anisotropy can have a large impact on the quality of wavefield separation.

Figure 4:
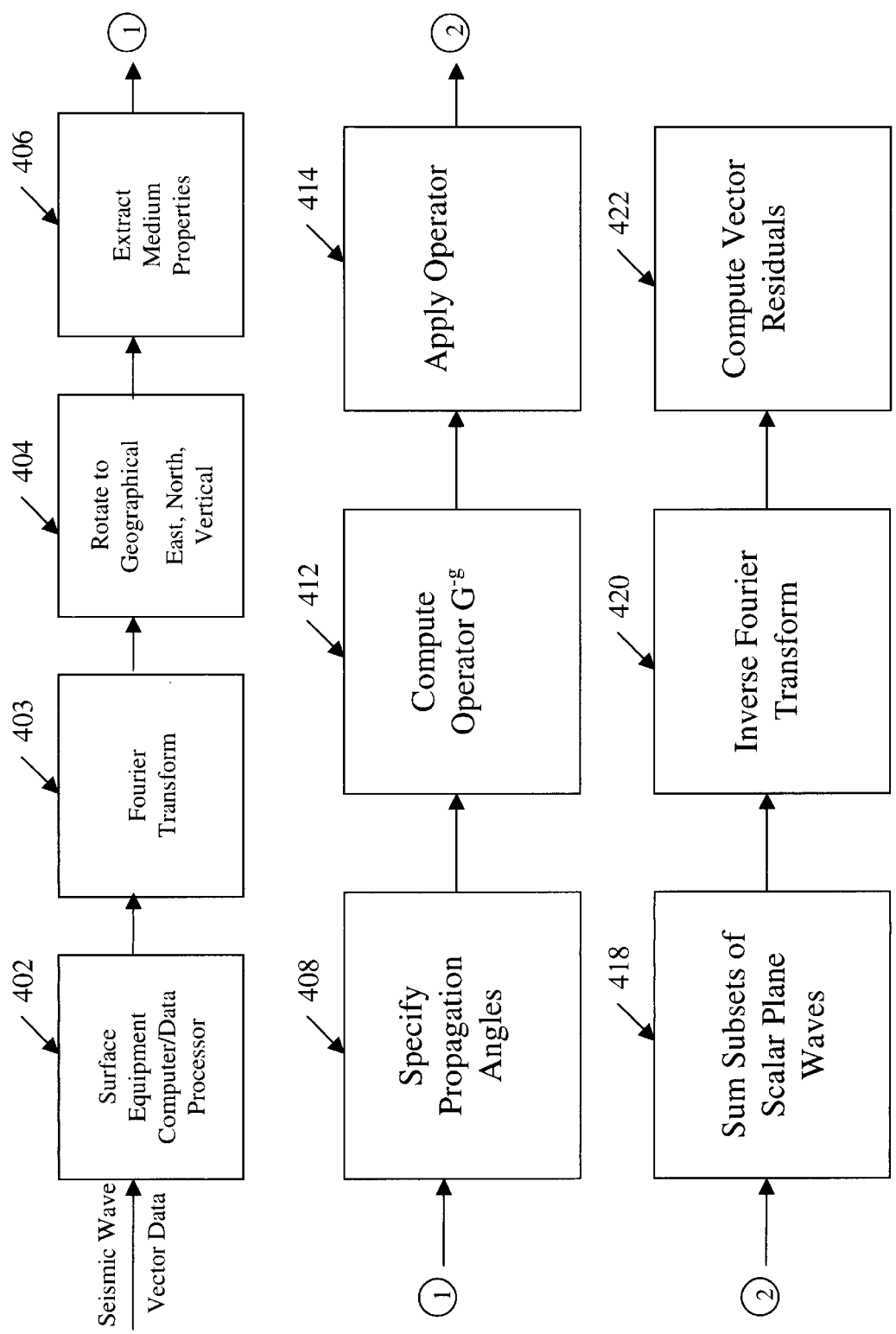
FIG. 4 is a flow diagram of a method in accordance with one embodiment of the present invention for anisotropic vector plane wave decomposition for 3D VSP data to evaluate properties related to the formation.

Referring to FIG. 4, seismic wave vector data is received and recorded by the surface equipment computer as illustrated by functional block 402. Vector data for a selected common shot gather are first Fourier transformed into the frequency domain as shown by functional block 403. The 3C downhole array data is rotated to geographical (East, North, Vertical) coordinates as shown by functional block 404. Medium properties at the receiver locations can be extracted from the forward-looking model or may be specified from other geologic or geophysical information, and propagation angles are specified for each wave type as shown by functional blocks 406 and 408 respectively, usually by specifying the angular aperture (elevation angle) and number of plane waves. The aperture may be centered relative to the geometric direct P ray, relative to the direct P polarization angle computed from the data, or relative to a constant angle from vertical. If central angle and aperture are constant for all shot locations, the operator need only be computed once, and computation time decreases with the number of shots. Aperture may also include an azimuthal component. Heterogeneity along the receiver array is handled approximately through slowness component averaging, while polarizations remain purely local.

The operator, $G^{-g}$, is computed as shown by functional block 412 and applied to the data as shown by functional block 414, subsets of scalar plane waves are summed as shown by functional block 418, and then the grouped plane waves are inverse Fourier transformed for the separated wavefields as shown by functional block 420. Vector residuals can be computed 422 for quality control (QC) purposes, or they can be used as input to a vector migration if the selected wave type (e.g. up P) is included in the residuals. In this way, the wavefield separation operator can act as a coherent noise attenuation filter. If there are fewer plane waves than receivers the residuals can be minimized iteratively to determine medium properties.

Figure 5:
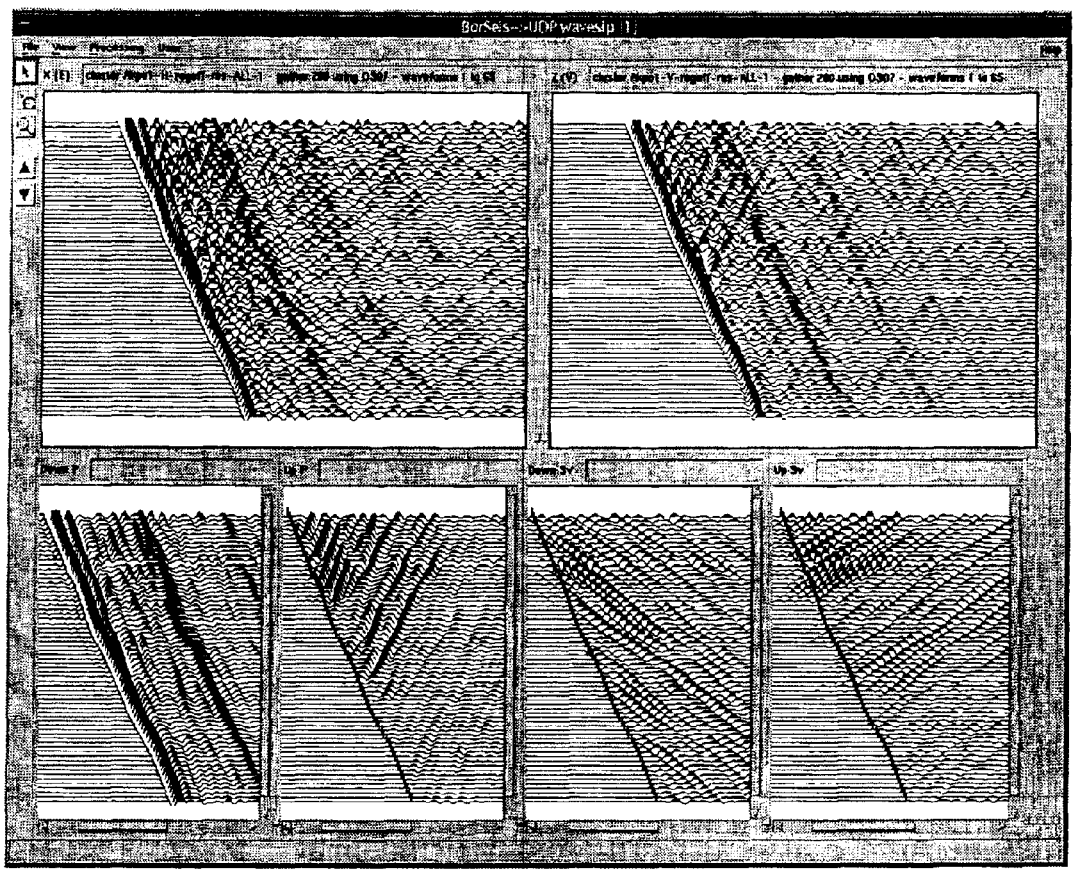
FIG. 5 shows an example of offset VSP data results.
Figure 6:
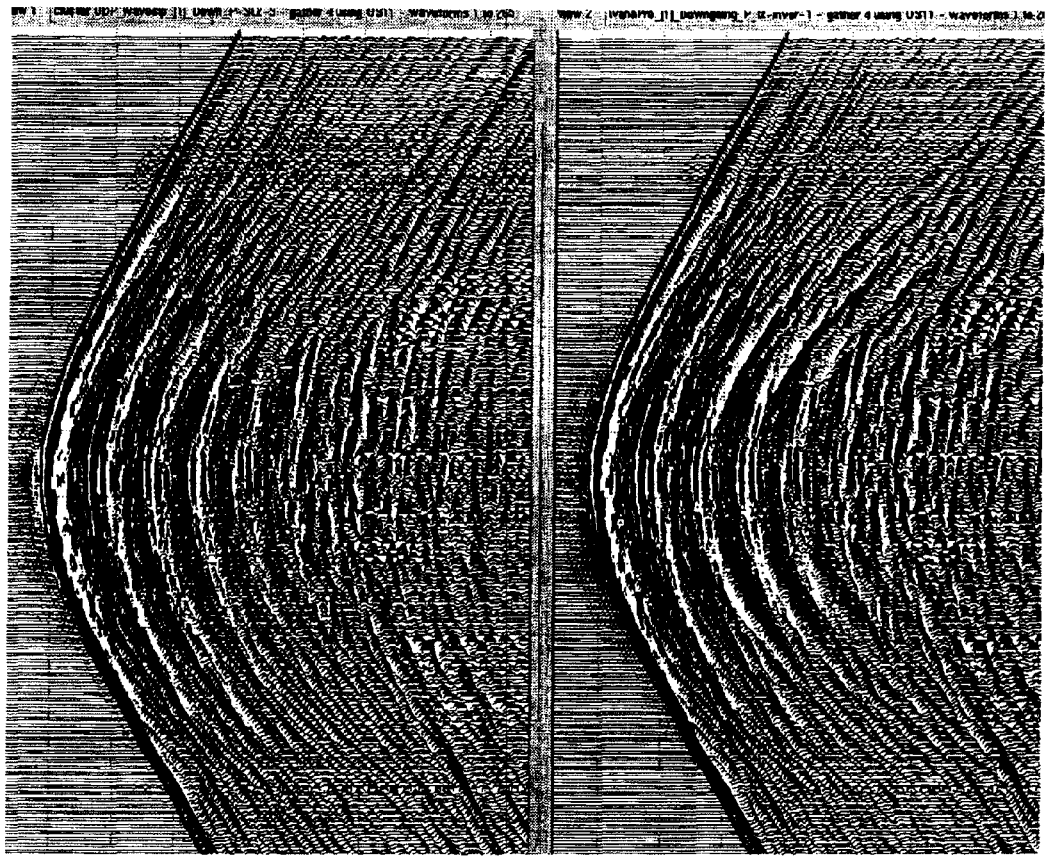
FIG. 6 shows an example of down P walk away data results.
Figure 7:
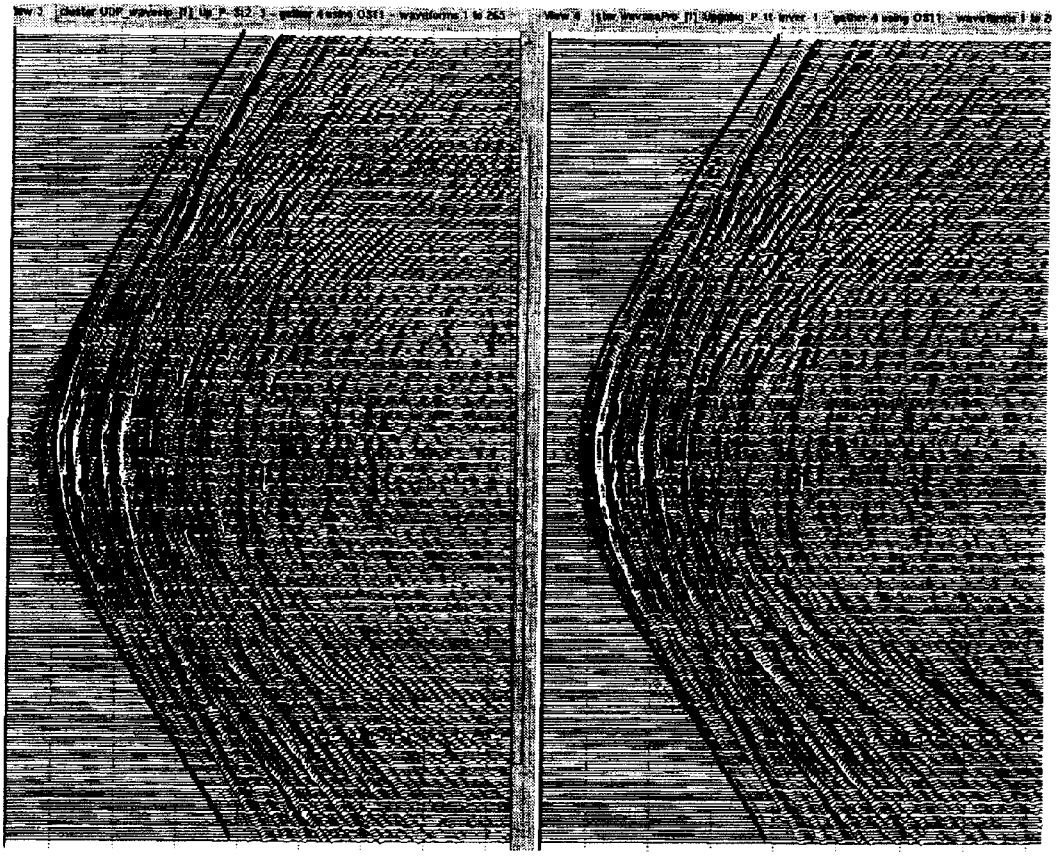
FIG. 7 shows an example of up P walk away data results.

Two real data examples are shown, one from an offset VSP and a second from an 8-level seismic array tool field test walkaway. In both cases a one-dimensional wavefield separation. FIG. 5 shows the offset VSP results, FIG. 6 shows the down P walkaway results and FIG. 7 shows the up P walkaway results. All results are shown in true relative amplitude. In FIGS. 6 and 7 the present invention is compared with the prior art PWD method). We see remarkably good agreement considering that 8 planes waves versus one have been estimated for each shot. Since the plane wave spectrum of the present invention is so much richer, amplitudes of diffraction tails and multiples are recovered better. The present invention exhibits slightly better temporal resolution and the converted shear, which is particularly strong in this data set, is also more completely attenuated using the present invention.

The various embodiments of the anisotropic vector plane wave decomposition method and apparatus and examples shown above illustrate a novel invention for the decomposition of 3D VSP data. A user of the present invention may choose any of the above embodiments, or an equivalent thereof, depending upon the desired application. In this regard, it is recognized that various forms of the subject anisotropic vector plane wave decomposition invention could be utilized without departing from the spirit and scope of the present invention.

As is evident from the foregoing description, certain aspects of the present invention are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the sprit and scope of the present invention.

Other aspects, objects and advantages of the present invention can be obtained from a study of the drawings, the disclosure and the appended claims.

What is claimed is:

1. A method for decomposition of a seismic plane wave for three dimensional vertical seismic profile data comprising the steps of:
   a. receiving a plurality of signals from a downhole seismic receiver array;
   b. Fourier transforming all waveforms to the frequency domain;
   c. specifying plane wave propagation angles for each wave type by specifying an angular aperture and a number of plane waves;
   c. specifying medium properties local to the receiver array;
   d. computing polarization and slowness vectors using the propagation angles and the medium properties;
   e. inputting the polarization and slowness vectors into a polarization moveout matrix and computing an operator;
   g. applying the operator to the vector data to determine scalar plane wave Fourier coefficients;
   h. summing subsets of scalar plane waves into grouped plane waves; and
   i. inverse Fourier transforming the grouped plane waves to decompose the wavefields into its separate components.

2. The method as recited in claim 1 where the seismic receiver array includes 3C geophones.

3. The method as recited in claim 2 further comprising the step of:
   rotating and orienting all components of the seismic receiver array data to geographic coordinates.

4. The method as recited in claim 1, where specifying plane wave propagation angles comprises a number of plane waves and specifying an angular aperture adequate for the number of plane waves.

5. The method as recited in claim 1, where specifying medium properties includes specifying anisotropic elastic moduli and symmetry axis angles.

6. The method as recited in claim 1, where computing the polarization and slowness vectors is by using a range of propagation angles and general anisotropic medium properties through a forward modeling step using a symmetry axes of the medium and a propagation angle for the medium with respect to the symmetry axis.

7. The method as recited in claim 1 further comprising the step of:
computing a model resolution matrix and a model covariance matrix from the moveout matrix to study the properties of the operator.

8. The method for decomposition of a seismic vector plane wave as recited in claim 1 further comprising the step of:
regularizing the moveout matrix at aliasing frequencies when colinear polarization occurs to maintain operator stability by damping.

9. The method for decomposition of a seismic vector plane wave as recited in claim 8 where regularizing further comprises the step of determining the wave type and frequency-dependent damping factors by examining the values of the product of the moveout matrix and the Hermitian transpose of the moveout matrix in the off diagonal blocks.

10. The method for decomposition of a seismic vector plane wave as recited in claim 1 further comprising the steps of:
computing vector residuals; and
inputting the vector residual into a vector migration.

11. The method for decomposition of a seismic vector plane wave as recited in claim 10 further comprising the step of:
attenuation filtering signal noise with said operator.

12. The method for decomposition of a seismic vector plane wave as recited in claim 10 further comprising the step of:
iteratively minimizing the vector residuals to determine the medium properties.

13. The method as recited in claim 1 where the seismic receiver array includes 4C seismic receivers.

14. The method as recited in claim 1 where the seismic receiver array includes hydrophones.

15. A method for decomposition of a seismic vector plane wave for three dimensional vertical seismic profile data comprising the steps of:
a. providing a surface equipment processor operable to record a plurality of signals, where said processor is further operable to receive said plurality of signals from a downhole logging tool said tool including a seismic receiver array where said signal is representative of vector data of a seismic wavefield sensed by the seismic receiver array;
b. providing an executable algorithm stored on said surface equipment processor such that when the processor executes the algorithm a method is performed comprising the steps of:
  i. Fourier transforming all waveforms;
  ii. specifying medium properties local to the receiver array;
  iii. specifying plane wave propagation angles for each wave type by specifying an angular aperture and a number of plane waves;
  iv. computing polarization and slowness vectors using the propagation angles and the medium properties;
  v. inputting the polarization and slowness vectors into the polarization moveout matrix and computing an operator;
  vi. applying the operator to the vector data to determine scalar plane wave Fourier coefficients;
  vii. summing the subsets of scalar plane waves into grouped plane waves; and
  viii. inverse Fourier transforming the grouped plane waves to decompose the wavefields into its separate components.

16. The method as recited in claim 15 further comprising the step of:
rotating and orienting all components of the downhole seismic receiver array data to geographic coordinates.

17. The method as recited in claim 15 where specifying medium properties includes specifying transverse isotropic elastic moduli and symmetry axis angles.

18. The method as recited in claim 15 where computing the polarization and slowness vectors is by using a range of propagation angles and tilted transverse isotropic medium properties through a forward looking modeling step using a symmetry axes of the medium and a propagation angle for the medium with respect to the symmetry axis.

19. The method as recited in claim 15 further comprising the step of:
regularizing the moveout matrix at aliasing frequencies when colinear polarization occurs to maintain operator stability by damping.

20. The method as recited in claim 19 where regularizing further comprises the step of determining the wave type and frequency-dependent damping factors by examining the values of the product of the moveout matrix and the Hermitian transpose of the moveout matrix in the off diagonal blocks.

21. The method as recited in claim 15 further comprising the steps of:
computing vector residuals; and
inputting the vector residual into a vector migration.

22. The method as recited in claim 21 further comprising the step of:
attenuation filtering signal noise with said operator.

23. The method as recited in claim 21 further comprising the step of:
iteratively minimizing the vector residuals to determine the medium properties.

24. A method for decomposition of a seismic plane wave for three dimensional vertical seismic profile data comprising the steps of:
a. transmitting uphole over a cable a plurality of signals from a downhole logging tool including a seismic receiver array;
b. rotating data of the plurality of signals to geographical coordinates;
c. recording the plurality of signals from said downhole logging tool, where said signals comprise seismic wavefields sensed by the seismic receiver array;
d. Fourier transforming all waveforms;
e. specifying transverse isotropic medium property moduli local to the detector array;
f. specifying plane wave propagation angles between the propagation direction and a symmetry axis of the medium relative to vertical for each wave type by specifying an angular aperture and a number of plane waves;
g. computing the polarization and slowness vectors using the propagation angles and the medium properties;
h. inputting the polarization and slowness vectors into a polarization moveout matrix and computing an operator;

i. applying the operator to the data to determine scalar plane wave Fourier coefficients;
j. summing the subsets of scalar plane waves into grouped plane waves; and
k. inverse Fourier Transforming the grouped plane waves and decomposing the wavefields into its separate components.

25. The method as recited in claim 24 where the seismic receiver array includes receivers arranged to detect particle motion along three orthogonal axes.

26. The method for decomposition of a seismic vector plane wave as recited in claim 24 further comprising the step of:
rotating and orienting all components of the seismic receiver array data to geographic coordinates.

27. The method as recited in claim 24 where specifying medium properties includes specifying transverse isotropic elastic moduli and symmetry axis angles.

28. The method as recited in claim 24 where computing the polarization and slowness vectors is by using a range of propagation angles and tilted transverse isotropic medium properties through a forward looking modeling step using the symmetry axis of the medium and a propagation angle for the medium with respect to the symmetry axis.

29. The method as recited in claim 24 further comprising the steps of:
computing vector residuals; and
inputting the vector residual into a vector migration.

30. The method as recited in claim 29 further comprising the step of:
attenuation filtering signal noise with the operator.

31. The method as recited in claim 29 further comprising the step of:
iteratively minimizing the vector residuals to determine the medium properties.

32. The method as recited in claim 24 where the seismic receiver array includes 3C geophones.

33. The method as recited in claim 24 where the seismic receiver array includes 4C seismic receivers.

34. The method as recited in claim 24 where the seismic receiver array includes hydrophones.

35. The method as recited in claim 24 where the seismic receiver array includes geophone accelerometers.

36. A computer program product for decomposition of a seismic plane wave data comprising:
a. a computer useable medium and computer readable code embodied on said computer useable medium for causing a processor to record a plurality of signals received from a seismic receiver array deployed in a borehole, comprising:
i. computer readable program code devices configured to cause the surface equipment processor to effect Fourier transforming all waveforms;
ii. computer readable program code devices configured to cause the surface equipment processor to effect extracting and specifying medium properties local to the detector array;
iii. computer readable program code devices configured to cause the surface equipment processor to effect specifying plane wave propagation angles for each wave type by specifying an angular aperture and a number of plane waves;
iv. computer readable program code devices configured to cause the surface equipment processor to effect computing polarization and slowness vectors using the propagation angles and the medium properties;
v. computer readable program code devices configured to cause the surface equipment processor to effect inputting the polarization and slowness vectors into a polarization moveout matrix and computing an operator;
vi. computer readable program code devices configured to cause the surface equipment processor to effect applying the operator to the vector data to determine scalar plane wave Fourier coefficients;
vii. computer readable program code devices configured to cause the surface equipment processor to effect summing subsets of scalar plane waves into grouped plane waves; and
viii. computer readable program code devices configured to cause the surface equipment processor to effect inverse Fourier Transforming the grouped plane waves to decompose the wavefields into its separate components.

37. The computer program product for decomposition of a seismic vector plane wave as recited in claim 36 where the seismic receiver array includes seismic receivers arranged to detect particle motion along three orthogonal axes.

38. The method for decomposition of a seismic vector plane wave as recited in claim 37 further comprising:
computer readable program code devices configured to cause the surface equipment processor to effect rotating and orienting all components of the seismic receiver array, rotating downhole array data to geographic coordinates.

39. The method for decomposition of a seismic vector plane wave as recited in claim 36 further comprising:
computer readable program code devices configured to cause the surface equipment processor to effect computing vector residuals; and
inputting the vector residual into a vector migration.

40. The method for decomposition of a seismic vector plane wave as recited in claim 39 further comprising:
computer readable program code devices configured to cause the surface equipment processor to effect attenuation filtering signal noise with the operator.

41. The method for decomposition of a seismic vector plane wave as recited in claim 39 further comprising:
computer readable program code devices configured to cause the surface equipment processor to effect iteratively minimizing the vector residuals to determine the medium properties.

42. A method for decomposition of a seismic plane wave for three dimensional vertical seismic profile data comprising the steps of:
a. transmitting uphole over a cable a plurality of signals from a downhole logging tool including a seismic receiver array;
b. rotating the plurality of signals data to geographical coordinates;
c. recording the plurality of signals received from the downhole logging tool including the seismic detector array;
d. Fourier transforming all waveforms;
e. extracting and specifying transverse isotropic medium property moduli local to the detector array;
f. specifying plane wave propagation to symmetry axis tilt angles and deriving a propagation phase direction and an angle between the propagation direction and a symmetry axis of the medium relative to vertical for each wave type by specifying an angular aperture and a number of plane waves where the tilt angles are the dip angle relative to vertical and the azimuth of the down dip direction;

g. computing polarization and slowness vectors using the propagation angles and the medium properties;

h. inputting the polarization and slowness vectors into a polarization moveout matrix and computing an operator;

i. applying the operator to the data to determine scalar plane wave Fourier coefficients;

j. summing subsets of scalar plane waves into grouped plane waves by summing the product of the complex amplitude of the plane wave and the polarization moveout matrix; and k. inverse Fourier Transforming the grouped plane waves to decompose the wavefields into its separated components.

43. The method as recited in claim 42 where the seismic detector array includes 3C geophones, and further comprising the step of:

rotating and orienting all components of the seismic receiver array data to geographic coordinates.

44. The method as recited in claim 42 where the seismic detector array includes 4C seismic receivers, and further comprising the step of:

rotating and orienting all components of the seismic receiver array to geographic coordinates.

45. The method as recited in claim 42 where the seismic detector array includes hydrophones, and further comprising the step of:

rotating and orienting all components of the seismic receiver array to geographic coordinates.

46. The method as recited in claim 42 where the seismic detector array includes geophone accelerometers, and further comprising the step of:

rotating and orienting all components of the seismic receiver array to geographic coordinates.

47. The method as recited in claim 42 further comprising the steps of:

computing vector residuals; and inputting the vector residual into a vector migration.

48. The method as recited in claim 47 further comprising the step of:

attenuation filtering signal noise with the operator.

49. The method as recited in claim 48 further comprising the step of:

iteratively minimizing the vector residuals to determine medium properties.

50. A method for decomposition of a seismic plane wave for data comprising the steps of:

a. receiving a plurality of signals from a downhole seismic receiver array comprising 3C seismic receivers, where said signal is representative of vector data of a seismic wavefield sensed by the seismic receiver array;

b. specifying plane wave propagation angles for each wave type by specifying an angular aperture and a number of plane waves;

c. extracting and specifying medium properties local to the detector array;

d. computing polarization and slowness vectors using the propagation angles and the medium properties; and e. inputting the polarization and slowness vectors into a polarization moveout matrix and computing an operator.

51. The method as recited in claim 50 further comprising the step of:

regularizing the moveout matrix at aliasing frequencies when colinear polarization occurs to maintain operator stability by damping.

52. The method as recited in claim 50 further comprising the steps of:

computing vector residuals; and inputing the vector residual into a vector migration.

53. The method as recited in claim 52 further comprising the step of:

attenuation filtering signal noise with the operator.

54. The method as recited in claim 52 further comprising the step of:

iteratively minimizing the vector residuals to determine the medium properties.

55. A method for decomposition of a seismic vector plane wave for three dimensional vertical seismic profile data comprising the steps of:

a. recording a plurality of signals received from a downhole logging tool including a seismic receiver array;

b. specifying plane wave propagation angles for each wave type by specifying an angular aperture and a number of plane waves;

c. specifying medium properties local to the detector array; and d. computing polarization and slowness vectors using the propagation angles and the medium properties.

56. The method for decomposition of a seismic vector plane wave as recited in claim 55 where the seismic receiver array includes receivers arranged to detect particle motion along each of three orthogonal axes, and further comprising the step of rotating and orientating all components of the seismic detector array data to geographic coordinates.

* * * * *